United States Patent
Matumoto

(10) Patent No.: US 6,302,551 B1
(45) Date of Patent: Oct. 16, 2001

(54) METER FOR VEHICLE

(75) Inventor: Makoto Matumoto, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/577,122

(22) Filed: May 24, 2000

(30) Foreign Application Priority Data

May 25, 1999 (JP) .................................................. 11-145325
Dec. 1, 1999 (JP) .................................................. 11-342439

(51) Int. Cl.$^7$ .................................................. G01D 11/28
(52) U.S. Cl. .................................. 362/27; 362/28; 362/29; 362/489; 362/464; 362/466; 340/815; 315/77; 116/48; 116/286; 116/DIG. 36
(58) Field of Search ................................. 362/27, 31, 489, 362/464, 465, 466, 28, 29, 30; 116/48, 286, 287, 288, DIG. 36; 340/815; 315/77

(56) References Cited

U.S. PATENT DOCUMENTS 5,063,379 * 11/1991 Fabry et al. .......................... 340/784
6,168,280 * 1/2001 Ozawa .................................... 362/23
6,210,011 * 4/2001 Ikeuchi et al. .......................... 362/26

FOREIGN PATENT DOCUMENTS

| 195 34 020 | 3/1997 | (DE) . |
| 8-14500 | 2/1996 | (JP) . |
| 10-142007 | 5/1998 | (JP) . |
| 10142007 | 5/1998 | (JP) . |

* cited by examiner

Primary Examiner—Thomas M. Sember
Assistant Examiner—Ali Alavi
(74) Attorney, Agent, or Firm—Law Offices of David G. Posz

(57) ABSTRACT

A meter for a vehicle has a scale plate, a pointer and a plurality of light sources. A first light source lights a scale plate up from a backside thereof. A second light source lights the scale plate up through a light guiding plate. A third light source lights a pointer up from a base thereof. The first light and the second light have different colors. The first and second lights and the third light are activated with time lag. The light sources produce a novel appearance on the meter.

15 Claims, 11 Drawing Sheets

FIG. 11

METER FOR VEHICLE

CROSS REFERENCE TO RELATED APPLICATION

This application is based on Japanese Patent Application No. Hei 11-145325 filed on May 25, 1999 and No. Hei 11-342439 filed on Dec. 1, 1999, the contents of which are incorporated herein by reference.

BACKGROUND OF THE INVENTION

1. Field of the Invention

The present invention relates to a meter for a vehicle.

2. Description of Related Art

JP-A-09-21655 discloses a meter for a vehicle having a circuit board disposed between a scale plate and an actuator for driving a pointer. A light source for lighting both the plate and the pointer up is mounted on the circuit board. The light source lights the plate and the pointer up in a similar manner. Therefore, an appearance of the meter is monotonous and uninteresting.

SUMMARY OF THE INVENTION

The present invention addresses these drawbacks by providing an improved meter arrangement.

It is therefore an object of this invention to provide a meter for vehicle having an interesting appearance or a novel appearance.

According to a first aspect of the present invention, a light source for scales or a light source for a pointer is activated, and a remaining other one of the light sources is activated after a predetermined delay time. The light source for the scales may includes at least one of a light source for supplying transmitted light and a light source for supplying guided light. The transmitted light is provided along a thickness of a guide plate. The guided light is provided from an end of the guide plate and is guided along the main surface of the guide plate.

According to a second aspect of the present invention, the light source for supplying transmitted light and the light source for supplying guided light are selectively activated according to an environmental brightness of the vehicle.

According to a third aspect of the present invention, an adjusting means for adjusting a brightness of the light source for supplying transmitted light and the light source for supplying guided light is provided. The transmitted light and the guided light have different colors. Therefore, the scale plate is lighted up a mixed color of the light sources. The light source for the scales or the light source for the pointer is activated, and a remaining other one of the light sources is activated after a predetermined delay time.

According to a fourth aspect of the present invention, an adjusting means for adjusting a brightness of the light source for supplying transmitted light and the light source for supplying guided light is provided. The transmitted light and the guided light have different colors. The light source for supplying transmitted light and the light source for supplying guided light are selectively activated according to an environmental brightness of the vehicle.

According to a fifth aspect of the present invention, the transmitted light and the guided light have different colors.

Further, the meter may include a guide member for lighting the scales from the right side. Further, the transmitted light and the light for the pointer may have different colors. Further, it is preferable that a plurality of light sources are mounted on a circuit board. Further, the plate having the scales may be constructed from an inner portion and an outer portion, and the guide plate may supply light to the outer portion. Further, the inner portion and the outer portion may provide a path therebetween to permit the transmitted light passing through directly.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 11 is a sectional view showing a meter according to a fifth embodiment.

DETAILED DESCRIPTION OF PREFERRED EMBODIMENTS

Hereinafter, several preferred embodiments of this invention will be explained with reference to the accompanying drawings.

First Embodiment

Figure 1:
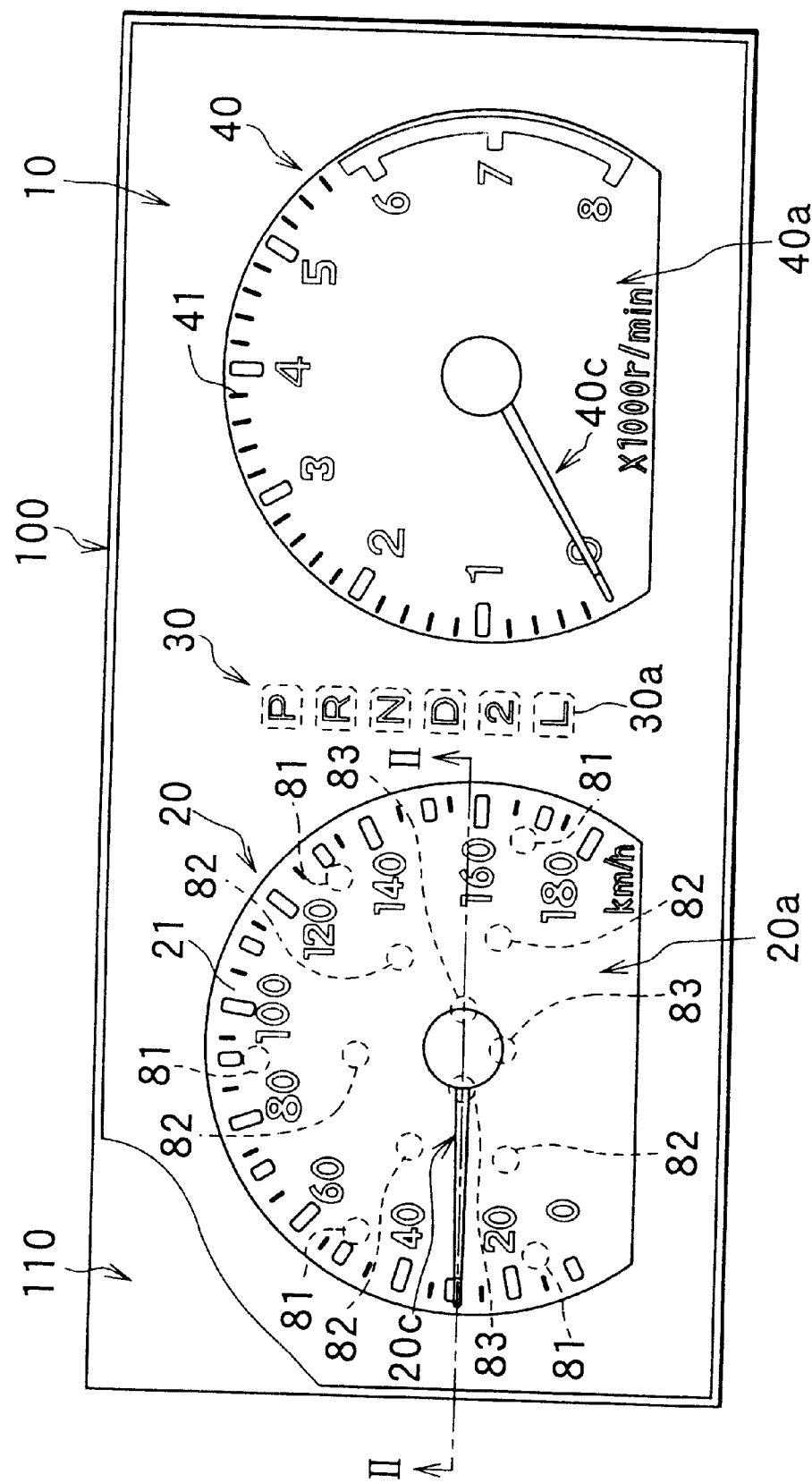
FIG. 1 is a partial cutaway plan view showing a meter according to a first embodiment of the present invention.
Figure 2:
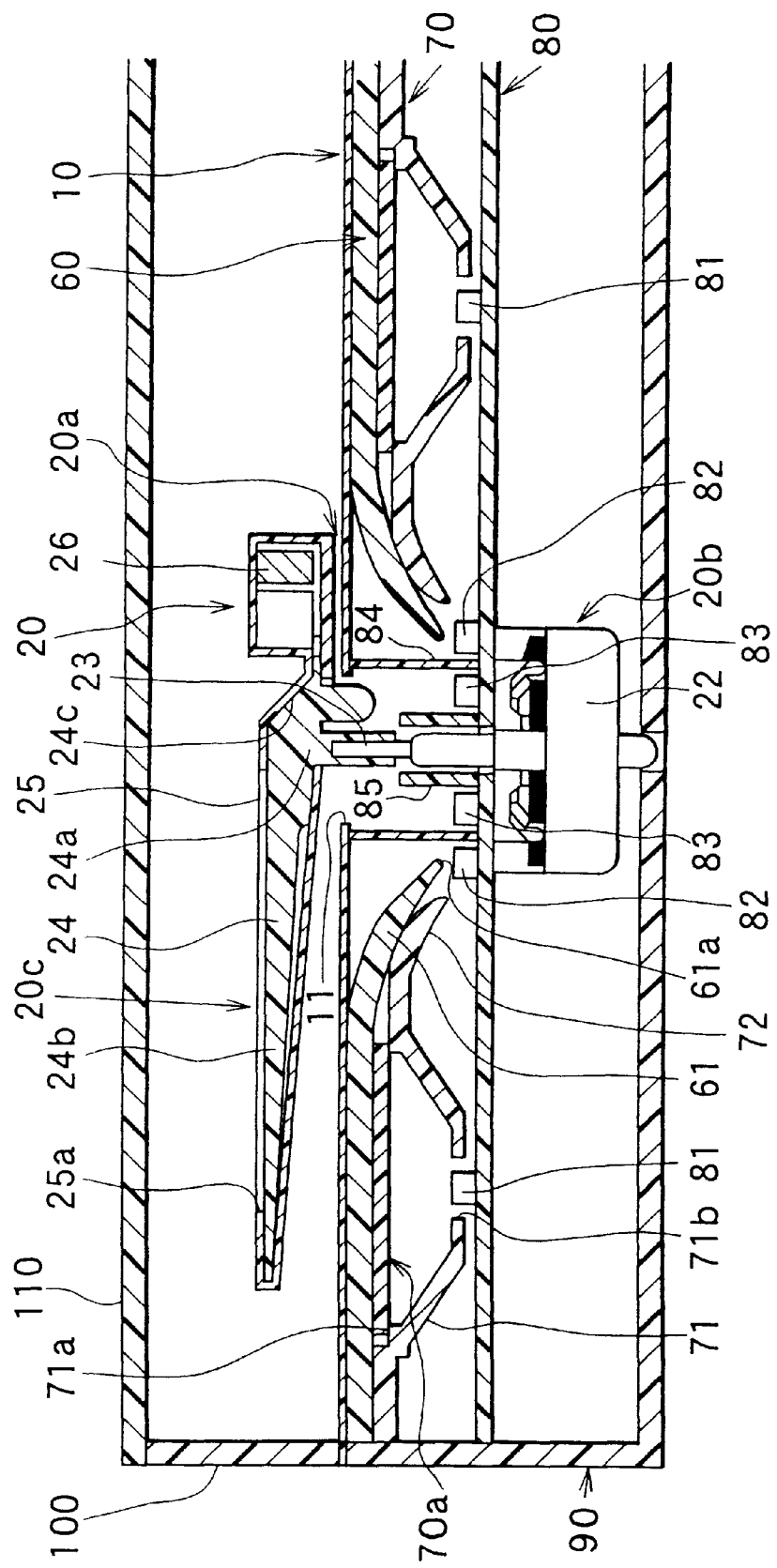
FIG. 2 is a partial sectional view of FIG. 1.

FIGS. 1 to 4 show a first embodiment in which the present invention is applied to a vehicular combination meter. The combination meter is provided to an instrument panel, and is provided with an instrument panel 10, a speedometer 20 provided to the instrument panel 10, an indicator 30, and a tachometer 40, as shown in FIGS. 1 and 2.

The speedometer 20 is provided with a scale plate 20a formed in the instrument panel 10 and an actuator 20b as a rotational actuator arranged at a backside of the instrument panel 10 at which corresponds to the scale plate 20a. The scale plate 20a is arranged at a left side in the instrument panel in FIG. 1. Here, the instrument panel 10 except of the scale plate 20a, an indicator part 30a described later, and a scale plate 40a is made of a black plate.

The scale plate 20a is made of a transparent material. The scale plate 20a includes a scale/character part 21 for displaying a speed of a vehicle and having a substantially circular arc shape. The scale/character part 21 has scales and characters, which are written in black.

The actuator 20b is provided with a cross coil type actuator 22 and a pointer shaft 23. The pointer shaft 23 rotatably extends from the actuator 22 to upward through a through hole of a circuit board 80, a lower end opening of a reflecting part 72 of a reflector 70 described later, a lower end opening 61a of a light guiding plate 60, and a through hole 11 of the instrument panel 10 (the scale plate 20a). Here, the actuator 20b is supported in a casing 90 with the circuit board 80, the reflector 70 and the light guiding plate 60. The actuator 22 drives the pointer shaft 23 by using an electromagnetic force in accordance with an input. The casing 90 is assembled with the instrument panel 10 from the back side of the instrument panel 10.

The speedometer 20 includes a light emitting pointer 20c. The emitting pointer 20c has a pointer body 24 and a cover 25. The pointer body 24 is made of a resin material having transparency for conducting light and is formed in a stick shape. The pointer body 24 is supported to a tip of the pointer shaft 23 at a boss of a base 24a. The base 24a of the pointer body 24 includes a slant surface 24c, as shown in FIG. 2. The slant surface 24c acts as a reflecting surface. The cover 25 is for covering the pointer body 24, and has a slit 25a at an upper wall thereof at which corresponding to an upper surface of a pointer part 24b of the pointer body 24.

According to this structure, in the light emitting pointer 20c, when light is inputted to the base 24a of the pointer body 24, the light is transmitted to inside of the pointer part 24b after being reflected by the slant surface 24c. After that, the light in the pointer part 24b is outputted through the slit 25a of the cover 25. In other words, the pointer part 24b emits light by outputting light through the slit 25a. The pointer body 24 has a balancer 26.

The light guiding plate 60 is made of a resin material having a transparency, and is arranged to the instrument panel 10 along a back surface thereof. The light guiding plate 60 has a light guiding part 61, which has a cross section of substantially dished shape, at a portion corresponding to the scale plate 20a. The light guiding part 61 concentrically positions with respect to the pointer shaft 23, and extends from a backside of the scale plate 20a to a lower portion in FIG. 2 to taper off to the lower portion so as to cover the pointer shaft 23.

The reflecting plate 70 is arranged to the light guiding plate 60 along a back surface thereof. The reflecting plate 70 has a reflecting part 71, which has a ring shape and a cross section of substantially dished shape, at a portion corresponding to the scale/character part 21 of the scale plate 20a. The reflecting part 71 extends from a backside of the light guiding plate 60 to a lower portion in FIG. 2 to taper off to the lower portion.

Furthermore, the reflecting plate 70 has a reflecting part 72, which has a cross section of substantially dished shape. The reflecting part 72 extends along a back surface of the light guiding part 61 of the light guiding plate 60 so as to taper off. A main surface of the reflecting plate 70 (a surface at a side of the light guiding plate 60) is printed with a white print material. A scatter plate 70a having a ring shape, which is made of a scatter resin material, is provided to the light guiding plate 60 along a back surface thereof at an upper end opening 71a of the reflecting part 71.

The circuit board 80 is supported to the instrument panel 10 in parallel therewith along the actuator 22 in the casing 90. Plural light sources 81 (first background light sources) are arranged in a lower end opening 71b of the reflecting part 71 along a circumferential direction of the lower end opening 71b with a predetermined distance interposed therebetween (FIG. 1). As a result, each of the light sources 81 emits light in the reflecting part 71. The light sources 81 act as light sources of transmitted light, and supply light along a thickness direction of the light guiding plate so as to light the scale plate from a backside thereof. Plural light sources 82 (second background light sources) are arranged at a main surface of the circuit board 80 along a circumferential direction of the upper end opening 61a with a predetermined distance interposed therebetween (FIG. 1) so as to confront with the lower end opening 61a of the light guiding part 61. Thus, the light sources 82 emit light into the reflecting part 61 through the lower end opening 61a. Each of the light sources 82 act as light sources of guided light, and supply light into the light guiding plate 60 along a surface direction of the light guiding plate 60 from an end thereof. The light in the light guiding plate 60a is outputted, and then lights the scale plate from the backside thereof.

Plural light sources 83 are arranged above the circuit board 80 along a circumferential direction with a predetermined distance interposed therebetween (FIG. 1) so as to confront with the base 24a of the light emitting pointer 20c. Thus, the light sources 83 input lights to the base of the pointer body 24b from a bottom surface thereof. The light sources 83 act as lights sources for the pointer. The light sources 81, 82 and 83 emit in different color each other. The numbers of the light sources 81, 82 and 83 may be changed.

An outer cylinder 84 is sandwiched between the instrument panel 10 and the circuit board 80, so as to position concentrically with respect to the pointer shaft 23 in the light guiding part 61 of the light guiding plate 60 and in the reflecting part 72 of the reflecting plate 70. An inner cylinder 85 is mounted on the main surface of the circuit body 80 in the outer cylinder 84, so as to position concentrically with respect to the outer cylinder 84. Each of the light sources 83 is arranged between the outer cylinder 84 and the inner cylinder 85. Each of the outer cylinder 84 and the inner cylinder 85 is made of shade resin material.

The tachometer 40 has substantially the same structure as the speedometer 20. The tachometer 40 has the scale plate 40a formed on the instrument panel 10 and the actuator 40b provided at a backside of the instrument panel 10 (see FIG. 3). The scale plate 40a has a display pattern part 41 for indicating revolutions of an engine of the vehicle.

Figure 3:
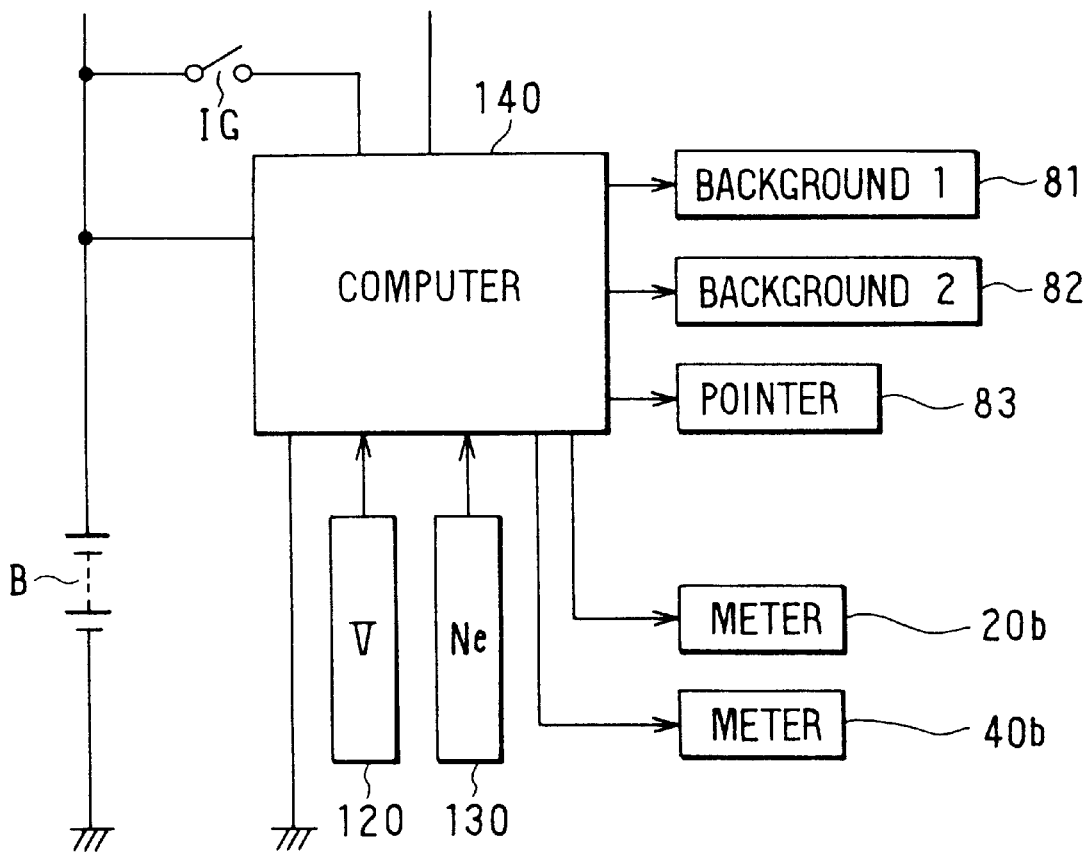
FIG. 3 is a circuit diagram according to the first embodiment.

The indicator 30 has the indicator part 30a formed on the instrument plate 10. The speedometer 20, the indicator 30, and the tachometer 40 are contained in the casing made up of an end plate 100 and a curved front panel As shown in FIG. 3, the combination meter has a speed sensor 120 for detecting a speed of the vehicle, a revolution sensor 130 for detecting revolutions of the engine, and a microcomputer 140. The microcomputer 140 executes a computer program based on a flowchart shown in FIG. 4. In this process, the microcomputer 140 executes a process for operating the actuators 20b and 40b based on detection outputs from the speed sensor 120 and the revolution sensor 130, and a process for turning on/off the light sources 81, 82 and 83. The computer program is previously stored in a ROM of the microcomputer 140. The microcomputer 140A is directly powered by a battery B mounted on the vehicle. An ignition switch IG as a key switch is also connected to the microcomputer 140.

Figure 4:
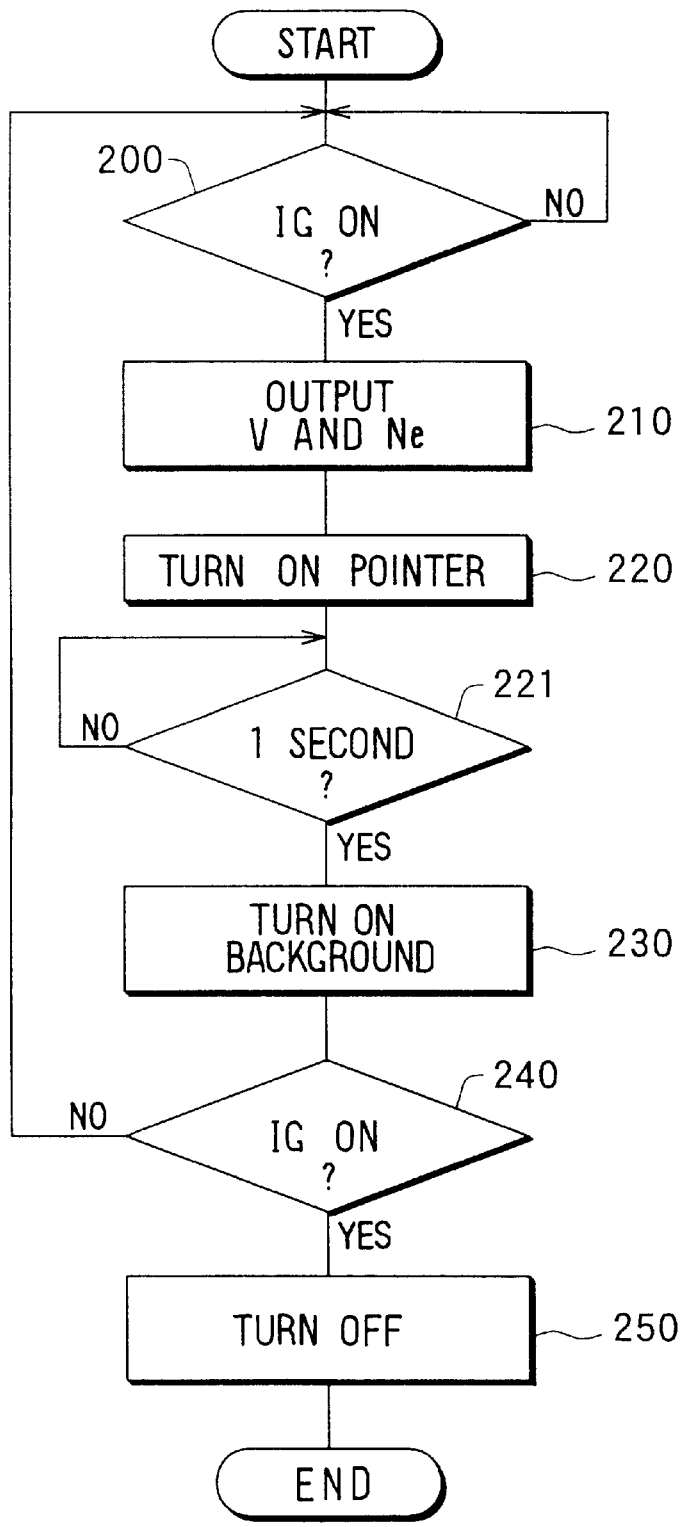
FIG. 4 is a flow chart showing a process of the first embodiment.

In the flowchart shown in FIG. 4, at step 200, the microcomputer 140 judges whether the ignition switch IG is turned on or not. Before, the ignition switch IG is turned on, the microcomputer 140 repeats the step 200 by determined as "NO". When the microcomputer 140 judges "YES" at step 200, the microcomputer 140 executes output process of the speed and revolutions based on each of the detection outputs from the speed sensor 120 and the revolution sensor 130.

After that, the speedometer 20 rotates the light emitting pointer 20c in accordance with the operation of the actuator 20b, and the tachometer 40 rotates the light emitting pointer 40c in accordance with the operation of the actuator 40b. Thus, the light emitting pointer 20c indicates the speed on the scale plate 20a, and the light emitting pointer 40c indicates the speed on the scale plate 40a. At step 220, the microcomputer 140 executes a process for lighting each light sources 83 of the speedometer and each light source for pointer of the tachometer 40. Thus, each of the light sources 83 of the speedometer and each of the light sources for pointer of the tachometer 40 are turned on. In the speedometer 20, the light from each of the light sources 83 enters into the pointer body 24 of the light emitting pointer 20c through the base 24a. The entered light is reflected by the slant surface 24c in the pointer body 24, and is transferred inside the pointer part 24b. After that, the light in the pointer part 24b is outputted from the slit 25a of the cover 25. The same operations are performed by the tachometer 40.

At step 221, the microcomputer 140 judges whether a predetermined delay time (e.g., 1 second) has passed or not. This judgment is performed by comparison between a measured time after step 220 by using a timer built in the microcomputer 140 and the predetermined delay time. Here, the timer is reset at the same time as the end of the step 220, so as to restart the measurement. When the measured time by the timer reaches the predetermined delay time, the microcomputer 140 judges as "YES" at step 221. At step 230, the microcomputer 140 performs a turning-on process of the light sources 81 and 82 of the speedometer 20, and the light sources of transmitted light and light sources of the guided light of the tachometer 40. As a result, the light sources 81 and 82 of the speedometer 20, and the light sources of transmitted light and light sources of the guided light of the tachometer 40 are turned on. As a result, the light of the each light source 8a is reflected by an inner surface of the reflecting part 71 of the reflecting plate 70, and is transmitted in the scale plate 20a as a uniform scattered light after being scattered in the scatter plate 70a. The same operations are performed by the tachometer 40.

At step 240, the microcomputer 140 judges whether the ignition switch IG is turned off or not. When the ignition switch IG is still on, the microcomputer 140 judges as "NO" at step 240, and repeats a loop of steps 200–230. On the contrary, when the ignition switch is turned off, the microcomputer 140 judges as "YES", and moves to step 250. At step 250, the microcomputer 140 stops the process for outputting the speed and the revolutions, and performs a process for turning off each light sources. As a result, indications by each of the light emitting pointers 20b and 40b are stopped, and each of the light sources of the speedometer 20 and the tachometer 40 is turned off.

As described in the above, after the ignition switch IG is turned on, each of the light sources for the pointer of the speedometer 20 and the tachometer 40 are turned on. Furthermore, after passing the predetermined delay time, each of the light sources of transmitted light and the light sources of guided light for the speedometer 20 and the tachometer 40 are turned on. Hence, after the light emitting pointer 20b emits the light through the slit 25a, and after the predetermined delay time passes, the scale plate 20a emits the light. Since the light sources are turned on with time lag having the predetermined time, it can achieve novel visibility. In this case, since a color of the scale plate is a combination of both emitting colors of the light sources of the transmitted light and the light sources of the guided light, the combined color is different from that of the light sources for the pointer. Therefore, it can further improve the novel visibility. Furthermore, since each of the light sources 83 is shaded by the outer cylinder 84, it can prevent the light from the light sources 83 from leaking to sides of the light sources 81 and 82. The same operations are performed in the tachometer 40.

Here, the light sources 83 may be turned on after a predetermined delay time after the process of the turning on the light sources 81 and 82. In this case, since the light sources 83 are turned on after the predetermined delay time during turning-on of the light sources 81 and 82, it can achieve substantially the same result as that of the first embodiment. Furthermore, each of colors of the light sources may be different from each other. In such a case, it can achieve the novel visibility by turning on them with the predetermined time lag.

Second Embodiment

Figure 5:
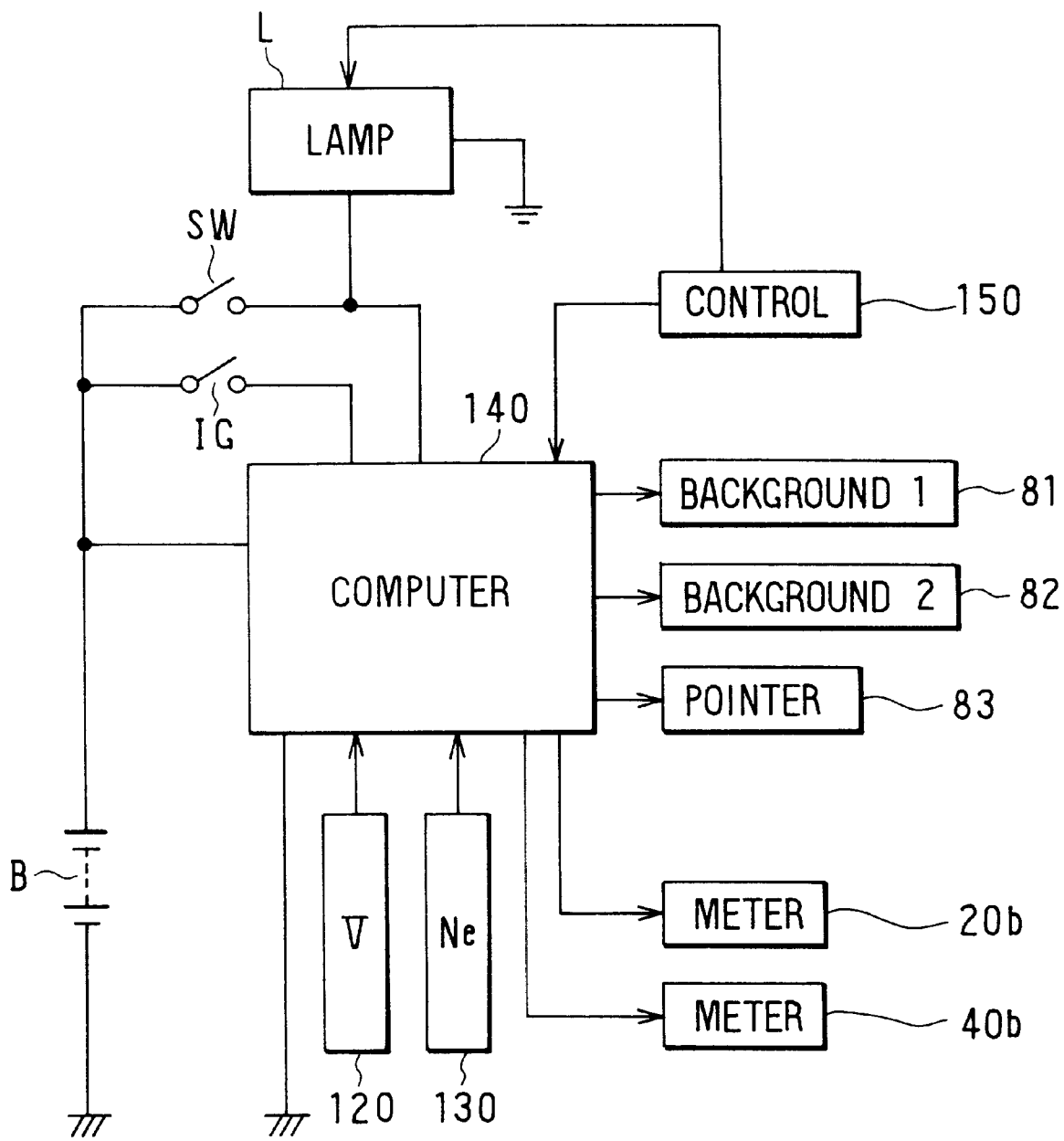
FIG. 5 is a circuit diagram according to a second embodiment.

Next, a second embodiment according to the present invention will be explained with reference to FIGS. 5 and 6. In this embodiment, an automatic lighter 150 is additionally connected to the microcomputer 140. In a dark environment such as night, when the automatic lighter 150 detects decrease of an amount of light (solar radiation) by using a not-shown light amounts sensor, the automatic lighter 150 turns on a lamp such as small lamp of the vehicle, and outputs a detected value of the amount of the light from the light amounts sensor to the microcomputer 140. The automatic lighter 150 acts as an environmental brightness detecting means.

The color of the emitting light of each of the light sources 81 is orange, and that of each of the light sources 82 is white.

Figure 6:
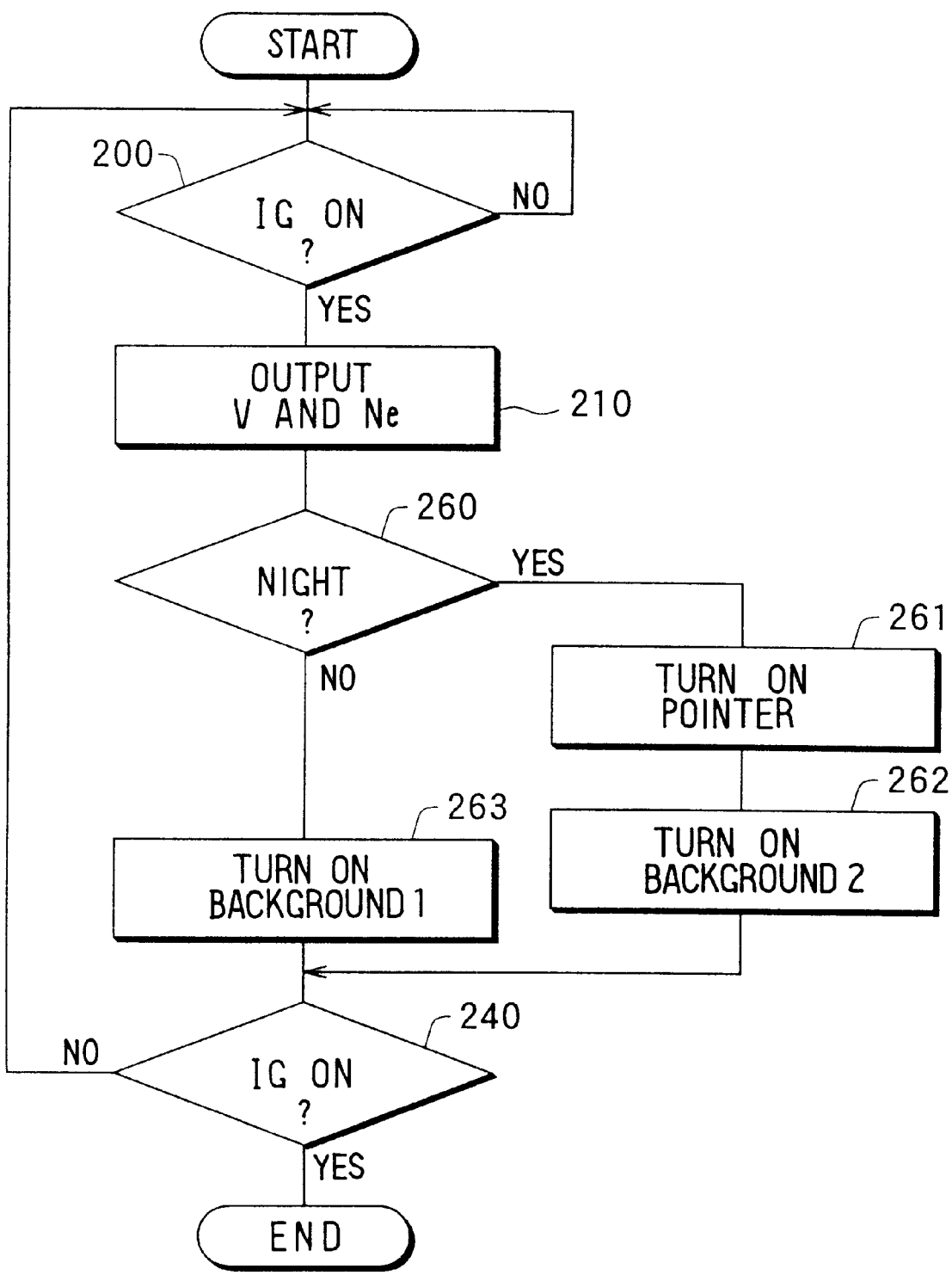
FIG. 6 is a flow chart showing a process of the second embodiment.

The microcomputer 140 executes the computer program based on a flowchart shown in FIG. 6. The other structure of this embodiment is the same as those of the first embodiment. Here, steps having the same step number as in the first embodiment are the same steps as those of the first embodiment. After ending the step 200, the microcomputer 140 judges whether the travel environment surrounding the vehicle is dark such as night or not, at step 260. When it is dark, the microcomputer 140 judges as "YES" at step 260 based on the detected value from the light amounts sensor. At step 261, the microcomputer 140 executes the process for turning-on the light sources for pointers of the speedometer 20 and the tachometer 40. As a result, each of the light sources for pointer turns on, and each of the light emitting pointers 20c and 40c emits the light from the slit. At step 262, the microcomputer 140 executes the process for turning-on the light sources of guided light of the speedometer 20 and the tachometer 40. As a result, each of the light sources of guided light turns on, and each of the scale plates 20a and 40a receives the light from the light guiding plate 60 and emits the light. On the contrary, when the microcomputer 140 judges as "NO" at step 260 based on the detected value from the light amounts sensor because the travel environment surrounding the vehicle is not dark such as daytime, the microcomputer 140 executes the process for turning-on the light sources of transmitted light of the speedometer 20 and the tachometer 40. As a result, each of the light sources of transmitted light turns on, and each of the scale plates 20a and 40a emits the light.

As described in the above, when the travel environment is dark such as nighttime, each of the light sources for pointer and the light sources of the guided light of the speedometer 20 and the tachometer 40 is turned on, whereas when the travel environment is not dark such as daytime, each of the light sources of the transmitted light of the speedometer 20 and the tachometer 40 is turned on. As a result, each scale plate 20a and 40a emits the light in white in the nighttime, and emits the light in orange in daytime. Thus, it can achieve novel visibility by changing the display color of the scale plates 20a and 40a.

Here, at step 260, the microcomputer 140 can detects the decrease of the light amounts based on whether the vehicle is in a tunnel or not.

In this embodiment, the emitting color of the light sources 81 is orange. However, the emitting color of the light sources 81 may be set natural color, and the scatter plate 70a may be made of scatter resin material having orange color or may be colored in orange. Furthermore, the emitting color of the light sources 81 of transmitted light may be white and that of the light sources may be orange.

In this embodiment, the judgment at step 260 is performed based on the output from the light amounts sensor of the automatic lighter 150, however, this judgment may be performed based on a turning-on signal of the small lamp or the like.

Third Embodiment

Figure 7:
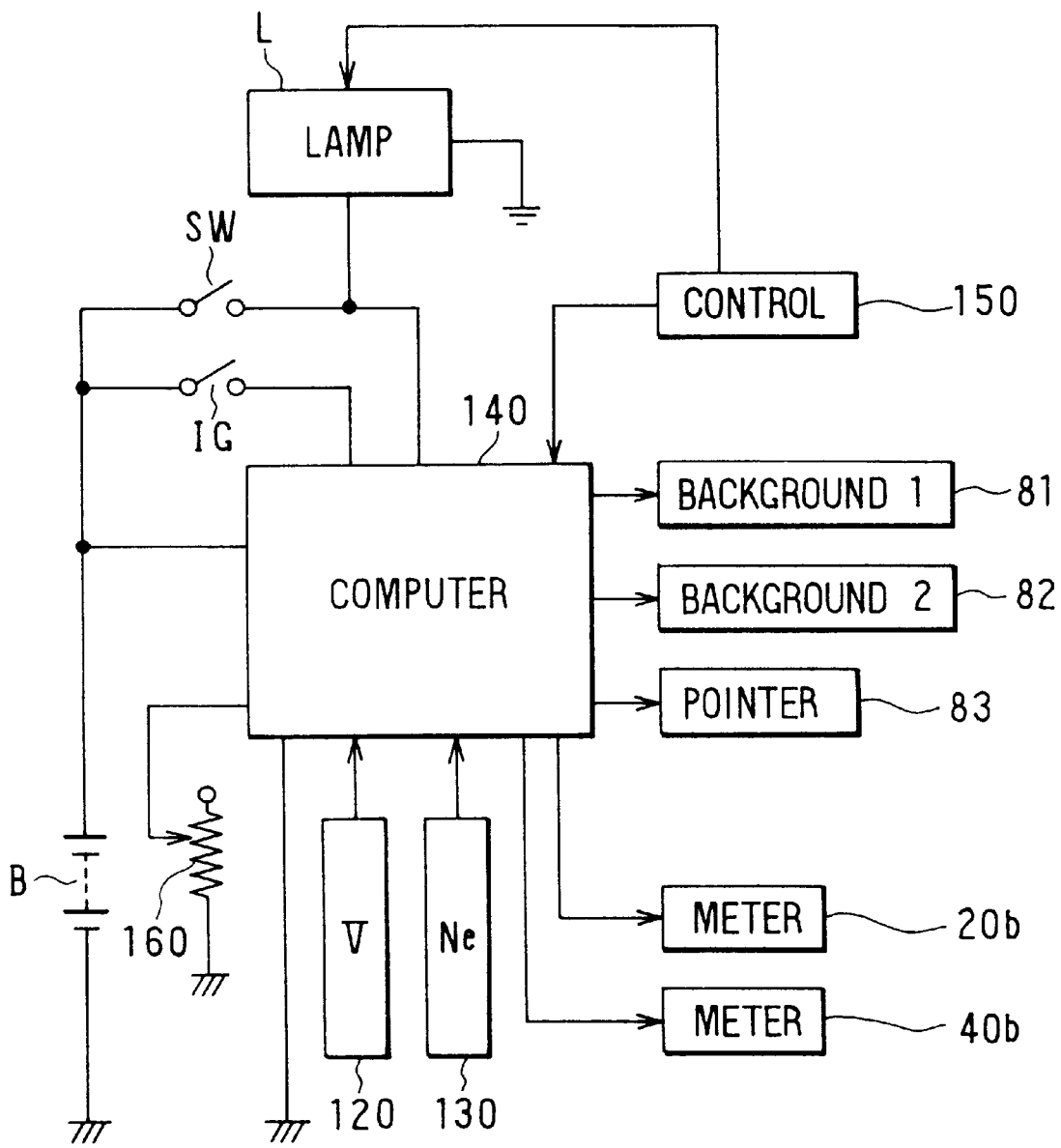
FIG. 7 is a circuit diagram according to a third embodiment.
Figure 8:
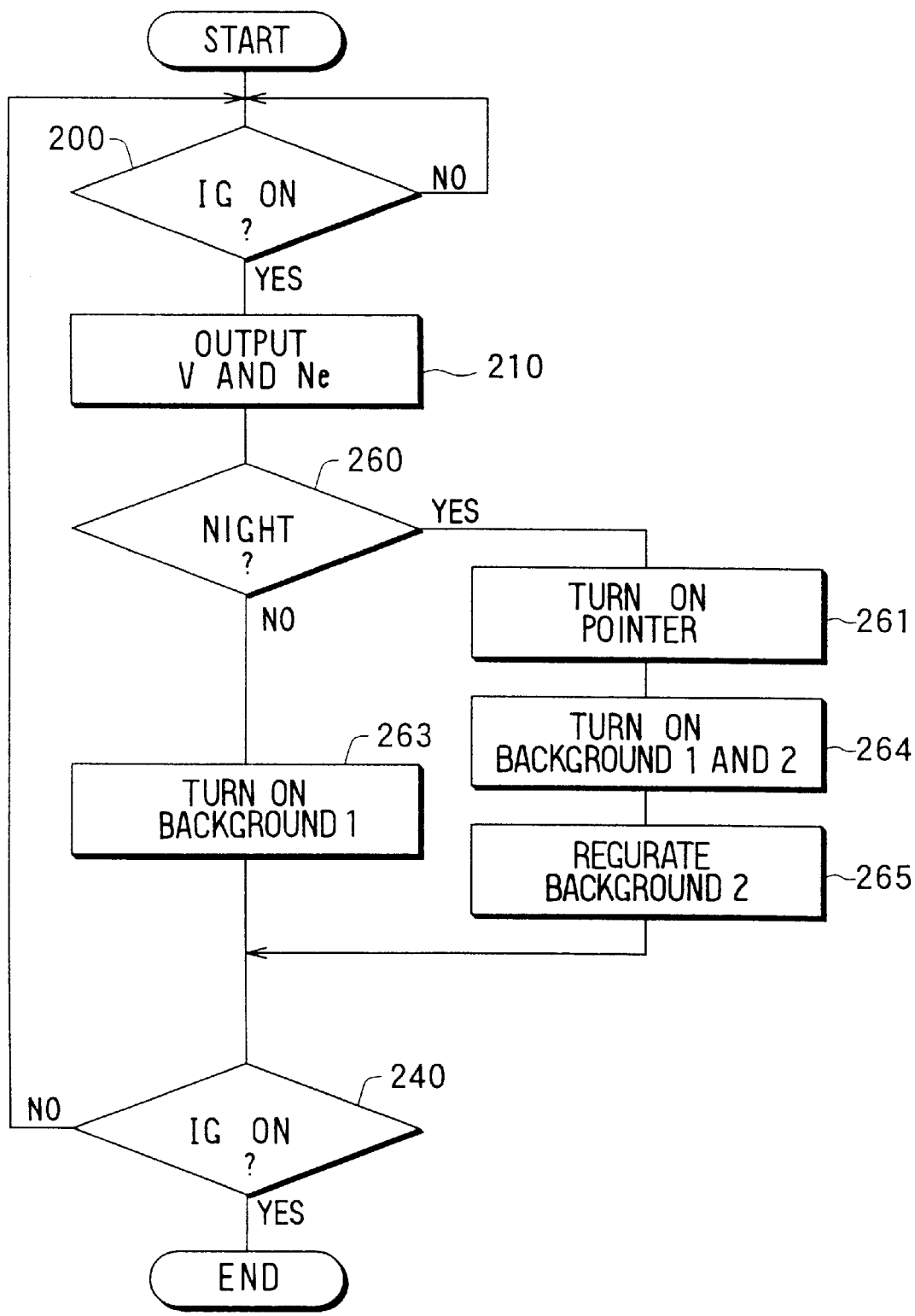
FIG. 8 is a flow chart showing a process of the third embodiment.

FIGS. 7 and 8 show a third preferred embodiment of the present invention, in which the same parts and components as those in the first and second embodiments are indicated by the same reference numerals. As shown in FIG. 7, the third embodiment adopts a structure in which a variable resistor 160 is connected to the microcomputer 140. The variable resistor 160 controls an amount of light emitted from the light sources 82 in the speed meter 20 and the tachometer 40 by acting as an adjusting means. A passenger of a vehicle can adjust a value of resistance of the variable resistor 160, which is input into the microcomputer 140. The value of resistance of the variable resistor 160 is inversely proportional to the amount of light from the light sources 82. Incidentally, in the speed meter 20 and the tachometer 40, each of he light sources 82 emits green light as guided light, and each of the light sources 81 emits orange light as transmitted light. The microcomputer 140 executes steps shown in a flowchart of FIG. 8. The other features are the same as those in the second embodiment described above.

Specifically, after the light sources 83 for the pointer are lighted at step 261, at step 264, the light sources 81 of transmitted light and the light sources 82 of guided light are lighted in the speed meter 20 and the tachometer 40. Next, at step 265, the amount of light emitted from the light sources 82 is controlled by the variable resistor 160. That is, the amount of light is controlled to be inversely proportional to the value of resistance of the variable resistor 160.

At this step, when the value of resistance of the variable resistor 160 is minimum, the amount of light emitted from the light sources 82 becomes maximum, for instance, in the speed meter 20. Accordingly, the strong green light emitted from the light sources 82 and the orange light emitted from the light sources 81 are synthesized, so that the light emitted from the scale plate 20a becomes yellow. On the other hand, when the value of resistance of the variable resistor 160 is maximum, the amount of light emitted from the light sources 82 becomes minimum. The green light emitted from the light sources 82 becomes weak significantly as compared to the orange light emitted from the light sources 81. As a result, the light emitted from the scale plate 20a becomes orange substantially.

Thus, the passenger can control the color of light emitted from the scale plate 20a between orange and yellow by changing the value of resistance of the variable resistor 160. The color of light emitted from the tachometer 40 is also controllable, resulting in novel and unique visibility of the scale meter 20 and the tachometer 40.

Another variable resistor may be adopted to control the amount of light emitted from the light sources 81. In this case, the color of light emitted from the scale plate can be controlled between orange and green through yellow, by controlling the values of resistance of the two variable resistors. As a result, light can be emitted with a widened color range desirably.

The steps 264 and 265 may be executed based on the 'NO' determination at the step 260, and the steps 261 and 263 may be executed based on the 'YES' determination at the step 260. The variable resistor 160 may be adopted for the first embodiment to control the color of light emitted from the light sources 81 to be green. In this case, the color of light can be controlled in accordance with the value of resistance of the variable resistor 160 at the step 230 shown in FIG. 4.

Fourth Embodiment

Figure 9:
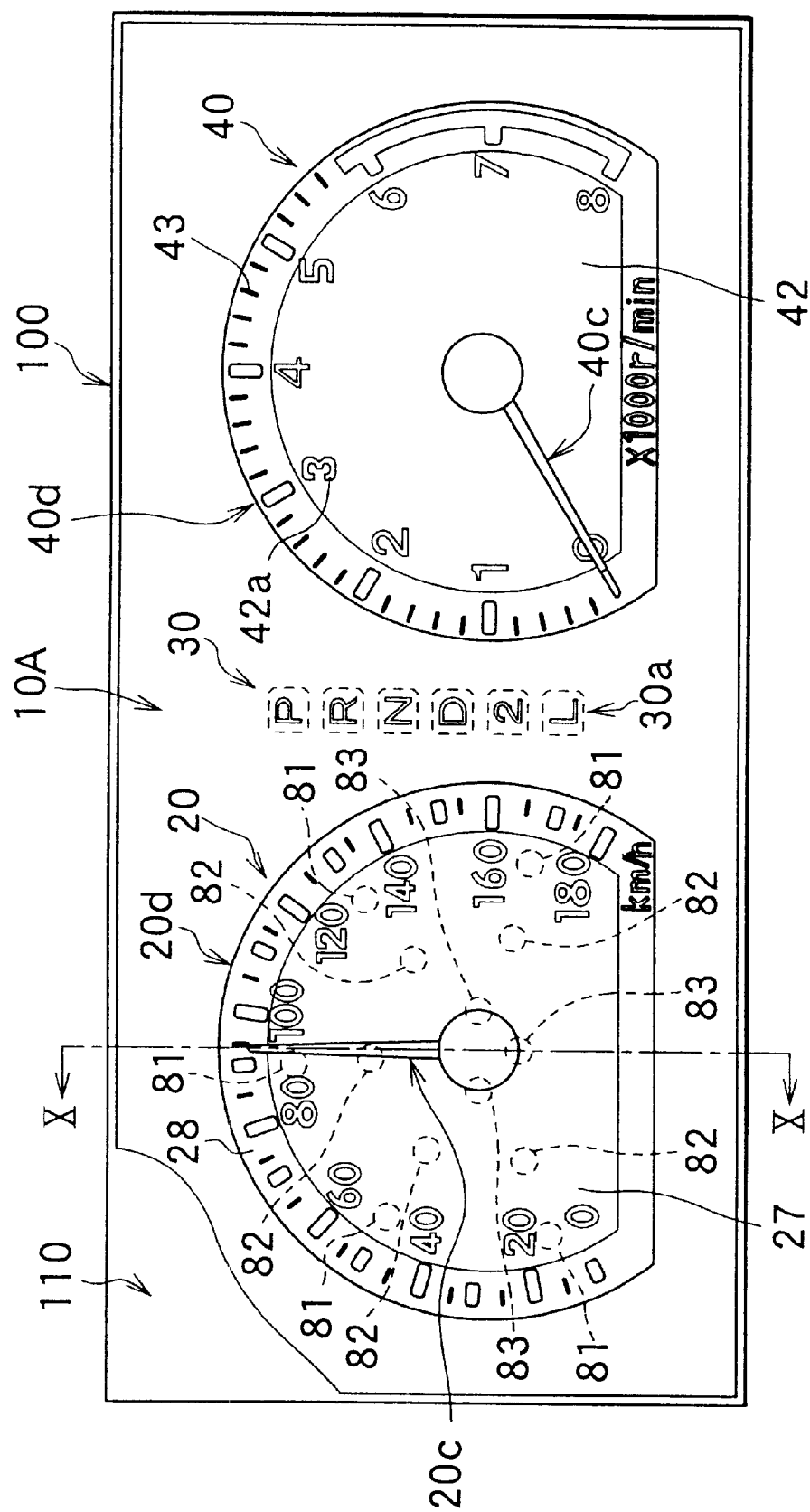
FIG. 9 is a partial cutaway plan view showing a meter according to a fourth embodiment.
Figure 10:
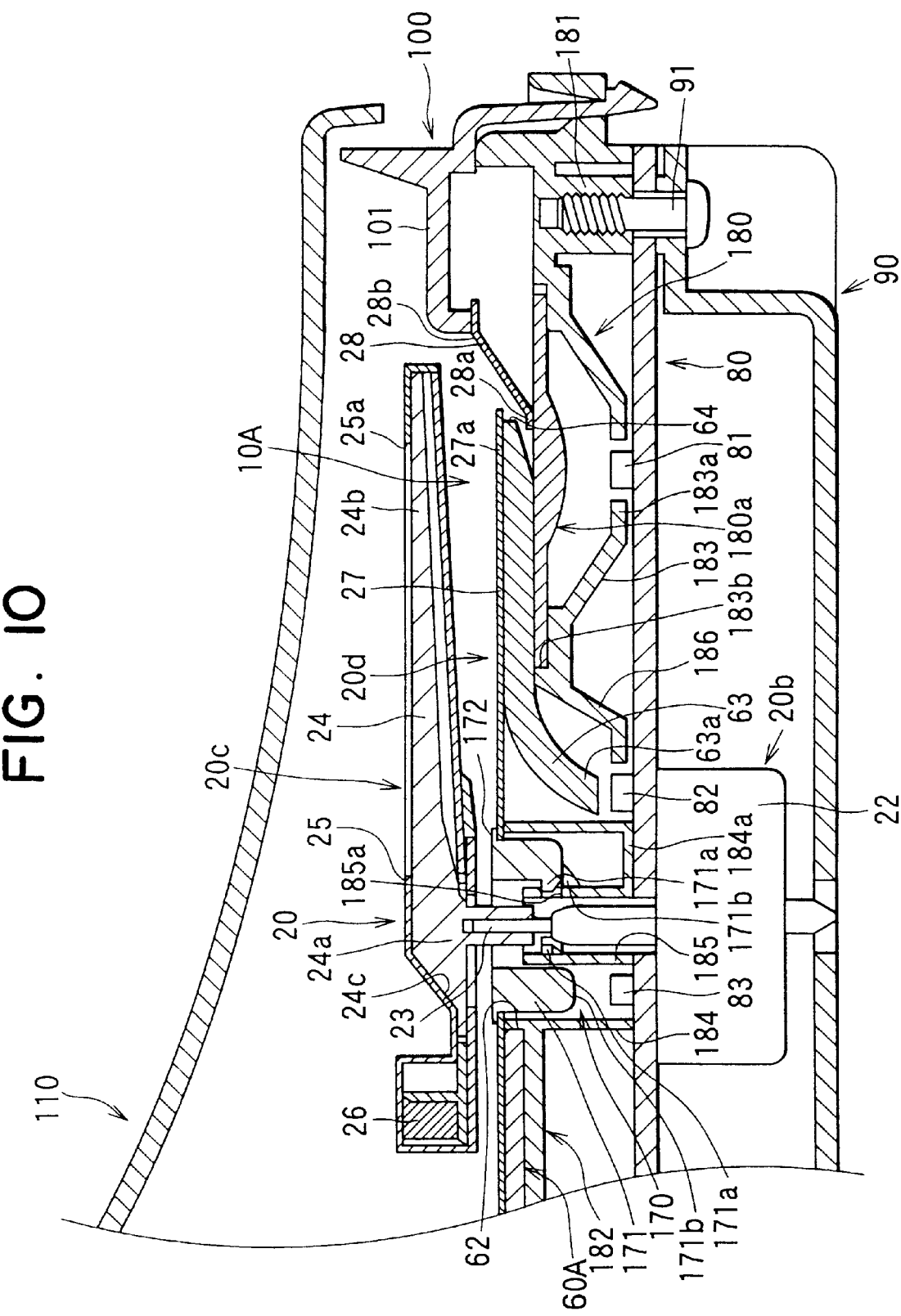
FIG. 10 is a partial sectional view of FIG. 9.

FIGS. 9 and 10 show a fourth preferred embodiment of the present invention. The fourth embodiment adopts an instrument panel 10A, a guide plate 60A, a guide member 170, a reflector 180, and an annular diffusion plate 180a.

The instrument panel 10A has scale plates 20d and 40d. The scale plate 20d is composed of a generally disk-shaped central portion 27 and a generally annular outer peripheral portion 28, which are coaxial with and separated from each other. The outer peripheral portion 28 is disposed along the outer circumference of the central portion 27. As shown in FIG. 10, the outer peripheral portion 28 has an inner circumference edge 28a positioned at a back surface side of an outer circumference edge 27a of the central portion 27. The outer peripheral portion 28 expands in cross-section from the inner circumference edge 28a toward an outer circumference edge 28b thereof to be exposed at the main surface side of the central portion 27 between the two edges 28a and 28b. The instrument panel 10A is fixed to an inner edge portion back surface of a bottom wall 101 of an end plate 100 at an outer circumference portion thereof.

The outer peripheral portion 28 corresponds to the scale part in the scale/character part 21 of the scale plate 20a in the second embodiment described above, and herebelow is referred to as a scale part 28. The outer circumference part of the central portion 27 corresponds to the character part in the scale/character part 21, and herebelow is referred to as a character part 27a. The other part than the character part 27a in the central portion 27 is substantially similar to that of the scale plate 20a excluding the scale/character part 21.

The scale plate 40d has substantially the same constitution as that of the scale plate 20d, and is composed of a generally disk-shaped central portion 42 and a generally annular outer peripheral portion 43, which respectively correspond to the central portion 27 and the outer peripheral portion 28 of the scale plate 20d. The outer peripheral portion 43 corresponds to the scale part in the scale/character part of the scale plate 40a, and the central portion 42 corresponds to the character part in the scale/character part of the scale plate 40a.

The guide plate 60A is disposed along the back surface of the instrument panel 10A, and has an opening portion 62 approximately coaxial with the pointer shaft 23 for receiving the pointer shaft 23 therein. The opening portion 62 is partially defined by an arc-like guide portion 63. As shown in FIG. 10, the guide portion 63 is curved and tapered in cross-section toward the side of the pointer shaft 23 to have a lower end portion 63a facing the light sources 82.

Further, the guide plate 60A has a generally circular end surface 64 at a back surface side of the outer circumference edge 27a of the central portion 27. The end surface 64 faces the surface of the scale part 28. A part of the guide plate 60A facing the scale plate 40d has substantially the same constitution as that facing the scale plate 20d as described above. The guide plate 60A is made of light guiding (light transmittance?) resin material.

The reflector 180 has an annular frame 181. The annular frame 181 is fitly disposed between the bottom wall 101 of the end plate 100 and the outer circumference portion of the circuit board 80, and is fixed to the casing 90 by a screw 91 via the outer circumference portion of the circuit board 80. Accordingly, the reflector 180 is fitly and fixedly disposed between the end plate 100 and the casing 90 via the circuit board 80.

The reflector 180 further has a reflection plate 182 constituting an upper wall of the annular frame 181. The reflection plate 182 has an outer cylindrical portion 184, an inner cylindrical portion 185, and reflection portions 183. The outer cylindrical portion 185 is positioned to correspond to the opening portion 62 of the guide plate 60A and extends disposed between the outer circumference portion of the opening portion of the scale plate 20d and the circuit board 80. The inner cylindrical portion 184 is disposed within the outer cylindrical portion 184 to be coaxial with the pointer shaft 23. The outer cylindrical portion 184 and the inner cylindrical portion 185 are connected to each other by an annular bottom wall 184a.

The reflection portions 183 are disposed at positions corresponding to the light sources 81. Specifically, each of the reflection portions 183 protrudes from the back surface side of the guide plate 60A toward the circuit board 80 to have an opening portion 183a at a lower end portion thereof. That is, each of the reflection portions 183 is tapered toward the circuit board 80 in cross-section. The reflection portions 183 are arranged along the back surface of the guide plate 60A to form an arc-like shape corresponding to a rotatable region of the light emitting pointer 20c in the scale plate 120d. Each of the light sources 81 is positioned in each lower end opening portion 183 of the reflection portions 183 accordingly. Incidentally, the surface of the reflection plate 182 including the reflection portions 183, the inner surface of the outer cylindrical portion 184, and the inner surface of the inner cylindrical portion 185 are printed with a white print material.

The reflector 180 further has a generally annular reflection portion 186, which is positioned approximately coaxially with respect to the guide portion 63. The annular reflection portion 186 is inclined at an inner circumference portion of the reflection portions 183 to protrude toward the light sources 82. Accordingly, the reflection portion 186 reflects light emitted from the light sources 82 toward the outer circumference surface of the guide portion 63. The annular diffusion plate 180a is disposed along the back surface of the guide plate 60A to close upper end side opening portions 183b of the reflection portions 183. The annular diffusion plate 180a is made of a diffusion resin material.

The guide member 170 is, as shown in FIG. 10, composed of a cylindrical member made of a light transmittance resin material, and is accommodated between the cylindrical portions 184 and 185 of the reflection plate 182. More specifically, the guide member 170 is composed of a cylindrical body 171 and an annular flange 172 outwardly protruding from an upper outer circumference portion of the body 171 in a radial direction thereof. The body 171 is held between the cylindrical portions 184 and 185, and the flange 17 is seated on the outer circumference portion of the opening portion of the scale plate 20d.

The body 171 has several protrusions 171 protruding radialy from an inner circumference surface thereof to be respectively engaged with engagement holes 185a defined in the inner cylindrical portion 185. Each engagement is achieved by the flange 172 pushing the outer circumference portion of the opening portion of the scale plate 20d against the upper end wall of the outer cylindrical portion 184. The body 171 is formed with three convex lenses 171b, each of which protrudes from the annular bottom wall (light source side annular end face) of the body 171 downwardly with a convex lens shape to face each of the light sources 83, although FIG. 10 shows only two of the convex lenses 171b.

Accordingly, the guide member 170 receives light emitted from each light source 83 at each convex lens 171b, transforms the light into parallel rays, and allows the parallel rays to pass through inside thereof. The guide member 170 then radiates the parallel rays from the upper end surface thereof toward the inside the base 24a of the pointer 20c.

In this case, as described above, light emitted from each light source 83 is transformed into parallel rays due to an optical effect of leach convex lens 171b, and enters the base 24a as parallel rays. Because of this, light emitted from each light source 83 can enter the base 24a as uniform light effectively, in accordance with the intensity of the light source 83 without decreasing the brightness thereof. As a result, the pointer 20c can emit light with a uniform brightness through the slit 25a of the cover 25 based on the light incident inside the base 24a, regardless of a rotating position thereof. Further, the cylindrical portions 184 and 185 reflect light from each light source 83 toward the guide member 170 to additionally improve a utilization factor of light.

Incidentally, light emitted from the light sources 82 is blue. The light enters the inside of the guide plate 60A through the guide portion 63, and is radiated from the end surface 64 of the guide plate 60A toward the scale part 28. As a result the scale part 28 is irradiated with the blue light. Simultaneously, the blue light conducted by the guide portion 63 is incident on the back surface of the central portion 27 of the scale plate 20d. Accordingly, the character part 27a of the central portion 27 apparently emits blue light darker than that apparently emitted from the surface of the scale part 28. That is, in this case, the indication by the pointer 20c can be observed in the state where the scale part 28 is irradiated with blue light brighter than that of the character part 27a.

In addition, a s described above, the character part 27a is inclined in cross-section. Because of this, in the night, the indication by the pointer 20c can be observed stereoscopically with a depth while being irradiated with blue light radiated from the surface of the scale part 28 through the end face 64 of the guide plate 60A.

On the other hand, when the light sources 81 of the speed meter 20 are lighted in the daytime, white light emitted from the light sources 81 is reflected by the reflection portions 183 to be diffused by the diffusion plate 180a, and then enters the scale plate 20d from the back surface thereof to pass through the scale plate 20d. At that time, a brightness of light passing through a gap between the central portion 27 and the scale part 28 is larger than that of light passing through the central portion 27 and the scale part 28. Therefore, the gap is brightened strongly with a generally annular shape. Also, as described above, the character part 27a is inclined in cross-section. Therefore, the indication by the pointer 20c can be observed stereoscopically with a depth even in the daytime while being irradiated with white light radiated from the diffusion plate 180a. The above effects can be achieved in the tachometer 40 as well.

When not only the light sources 82 but also the light sources 81 are lightened in the night, the surface of the scale part 28 are irradiated with both blue light from the end surface 64 of the guide plate 60A and white light from the diffusion plate 180a. Accordingly, the indication by the pointer 20c can be observed three-dimensionally with a depth while being irradiated with dark white light.

Fifth Embodiment

Figure 11:
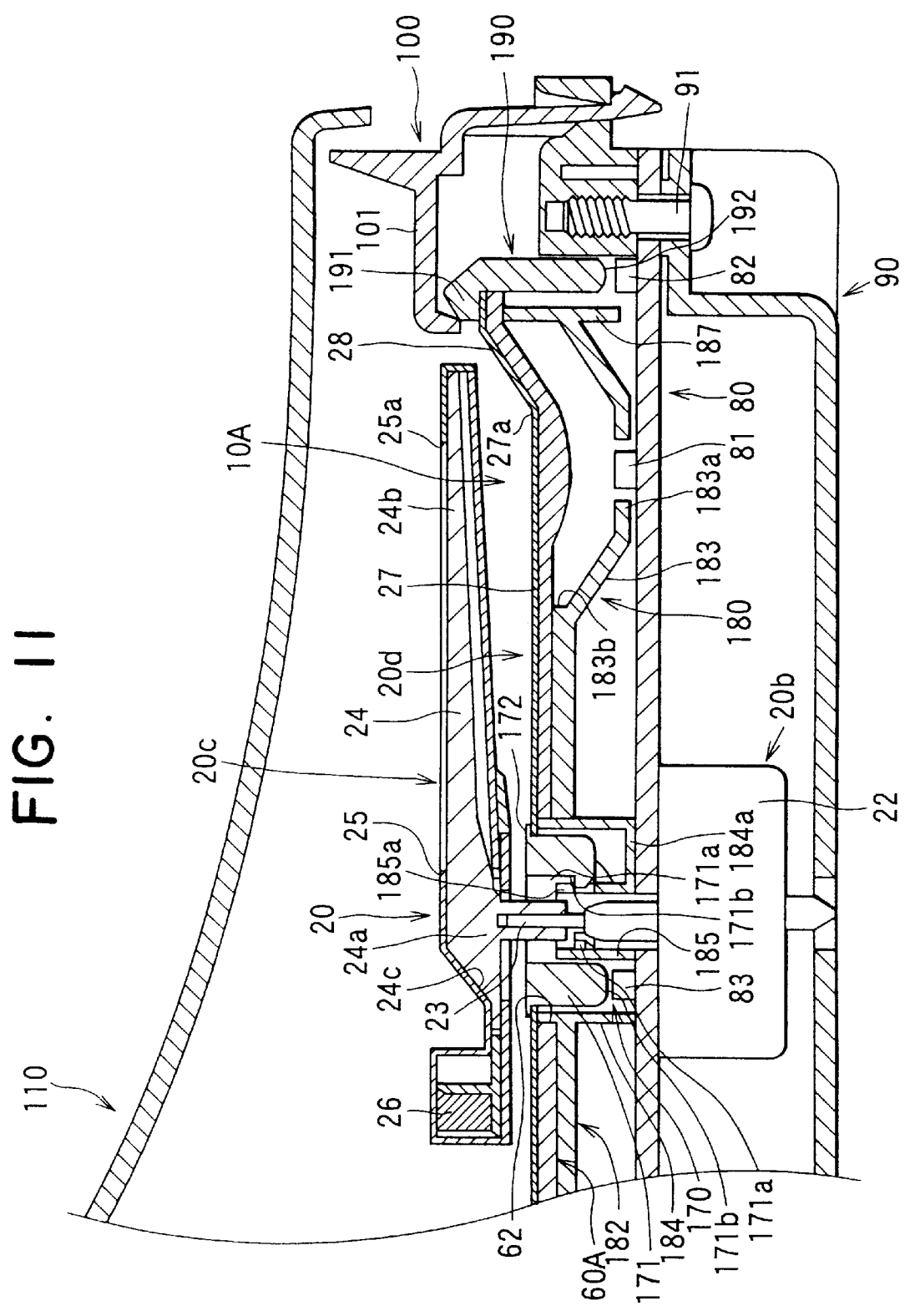

FIG. 11 shows a fifth preferred embodiment of the present invention. In the fifth embodiment, the scale part 28 is integrated with the central portion 27. The guide plate 60A extends to cover the upper end side opening portions 183b of the reflection portions 183 of the reflector 180.

Further, as shown in FIG. 11, a guide member 190 is disposed along an outer circumference wall 187 of the reflector 180, and has an L-shaped bent portions 191, which is exposed to the surface side of the scale plate 20d from a gap between the end portion of the bottom wall 101 of the end plate 100 and the upper end portion of the wall 187. The guide member 190 further has a lower end face 192 facing the light sources 82, which are disposed on the circuit board 81. Each of the light sources 82 emits white light, and each of the light sources 81 emits blue light. The other features are the same as those in the fourth embodiment.

Accordingly, when the indication by the pointer 20c is performed under light emitted from the light sources 83, the stereoscopic visibility of the indication can be enhanced by blue light from the light sources 81, white light from the light sources 82, or a dark blue light synthesized from the two colors of light when both the light sources 81 and 82 are lightened. In the present embodiment, the guide member 190 receives white light from the light sources 82 and radiates the light from the bent portions 191 toward the surface of the scale plate 20d. Accordingly, a novel illumination performance can be exhibited on the scale plate 20d. This effect can be provided in the tachometer 40 as well. Incidentally, the outer peripheral portion 28 may be formed separately from the central portion 27 as in the fourth embodiment. A step motor, a cross coil type motor, a movable coil type motor and a movable core type motor can be used as the actuator of the present invention. The meter may have only a speedometer or a tachometer. The pointer may be replaced by a pointer which does not emit light. A light bulb, a light emitting diode, a cold cathode-ray tube, a electro luminescent device or the like may be used as the light source of the present invention. For instance, a light emitting diode disposed inside of the base 24c of the pointer 24 may replace the light source 83. The present invention can be applied for not only a meter disposed on a vehicle having an ignition switch IG but also a meter disposed on an electric powered vehicle having a key switch as the ignition switch. The present invention can be applied for a meter of a passenger vehicle, a truck, a bus, a motorcycle or the like.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A meter for a vehicle, comprising:

a scale plate made of a transparent material having scales thereon;

a guide plate disposed along a backside of said scale plate for guiding light;

an actuator having a shaft passing through holes formed on said scale plate and said guide plate;

a light emitting pointer supported on said shaft at a base thereon;

a first light source for supplying light along a thickness direction of said scale plate from a backside thereof;

a second light source disposed in a radial inside of said first light source for supplying light into said guide plate from an end thereof;

a third light source disposed in a radial inside of said second light source for supplying light into said light emitting pointer from said base; and means for controlling said light sources so that at least one of said first and second light sources or said third light source is activated when a key switch of said vehicle is turned on, and that a remaining other one of said light sources is activated after a predetermined delay time.

2. A meter for a vehicle, comprising:

a scale plate made of a transparent material having scales thereon;

a guide plate disposed along a backside of said scale plate for guiding light;

an actuator having a shaft passing through holes formed on said scale plate and said guide plate;

a light emitting pointer supported on said shaft at a base thereon;

a first light source for supplying light along a thickness direction of said scale plate from a backside thereof;

a second light source disposed in a radial outside of said first light source for supplying light into said guide plate from an end thereof;

a third light source disposed in a radial inside of said first light source for supplying light into said light emitting pointer from said base;

means for controlling said light sources so that at least one of said first and second light sources or said third light source is activated when a key switch of said vehicle is turned on, and that a remaining other one of said light sources is activated after a predetermined delay time; and a guide member for guiding light to supply light of said second light source to the right side of said scale plate from an outside thereof.

3. A meter for a vehicle, comprising:

a scale plate made of a transparent material having scales thereon;

a guide plate disposed along a backside of said scale plate for guiding light;

an actuator having a shaft passing through holes formed on said scale plate and said guide plate;

a pointer supported on said shaft at a base thereon;

a first light source for supplying light along a thickness direction of said scale plate from a backside thereof;

a second light source disposed in a radial inside of said first light source for supplying light into said guide plate from an end thereof;

means for detecting an environmental brightness of said vehicle; and means for controlling said light sources so that said first light source or said second light source is activated according to a detected value of said detecting means.

4. A meter for a vehicle, comprising:

a scale plate made of a transparent material having scales thereon;

a guide plate disposed along a backside of said scale plate for guiding light;

an actuator having a shaft passing through holes formed on said scale plate and said guide plate;

a pointer supported on said shaft at a base thereon;

a first light source for supplying light along a thickness direction of said scale plate from a backside thereof;

a second light source disposed in a radial outside of said first light source for supplying light into said guide plate from an end thereof;

means for detecting an environmental brightness of said vehicle;

means for controlling said light sources so that said first light source or said second light source is activated according to a detected value of said detecting means; and a guide member for guiding light to supply light of said second light source to the right side of said scale plate from an outside thereof.

5. A meter for a vehicle, comprising:

a scale plate made of a transparent material having scales thereon;

a guide plate disposed along a backside of said scale plate for guiding light;

an actuator having a shaft passing through holes formed on said scale plate and said guide plate;

a light emitting pointer supported on said shaft at a base thereon;

a first light source for supplying light along a thickness direction of said scale plate from a backside thereof;

a second light source disposed in a radial inside of said first light source for supplying light into said guide plate from an end thereof, light having different color to said first light source;

a third light source disposed in a radial inside of said second light source for supplying light into said light emitting pointer from said base;

means for controlling said light sources so that said first and second light sources or said third light source is activated when a key switch of said vehicle is turned on, and that a remaining other one of said light sources is activated after a predetermined delay time; and means for adjusting a brightness of at least one of said first light source and said second light source.

6. A meter for a vehicle, comprising:

a scale plate made of a transparent material having scales thereon;

a guide plate disposed along a backside of said scale plate for guiding light;

an actuator having a shaft passing through holes formed on said scale plate and said guide plate;

a light emitting pointer supported on said shaft at a base thereon;

a first light source for supplying light along a thickness direction of said scale plate from a backside thereof;

a second light source disposed in a radial outside of said first light source for supplying light into said guide plate from an end thereof, light having different color to said first light source;

a third light source disposed in a radial inside of said second light source for supplying light into said light emitting pointer from said base;

means for controlling said light sources so that said first and second light sources or said third light source is activated when a key switch of said vehicle is turned on, and that a remaining other one of said light sources is activated after a predetermined delay time;

means for adjusting a brightness of at least one of said first light source and said second light source; and a guide member for guiding light to supply light of said second light source to the right side of said scale plate from an outside thereof.

7. A meter for a vehicle, comprising:

a scale plate made of a transparent material having scales thereon;

a guide plate disposed along a backside of said scale plate for guiding light;

an actuator having a shaft passing through holes formed on said scale plate and said guide plate;

a pointer supported on said shaft at a base thereon;

a first light source for supplying light along a thickness direction of said scale plate from a backside thereof;

a second light source disposed in a radial inside of said first light source for supplying light into said guide plate from an end thereof, light having different color to said first light source;

means for detecting an environmental brightness of said vehicle;

means for controlling said light sources so that said first light sources or said second light sources is activated according to a detected value of said detecting means; and means for adjusting a brightness of at least one of said first light source and said second light source.

8. A meter for a vehicle, comprising:

a scale plate made of a transparent material having scales thereon;

a guide plate disposed along a backside of said scale plate for guiding light;

an actuator having a shaft passing through holes formed on said scale plate and said guide plate;

a pointer supported on said shaft at a base thereon;

a first light source for supplying light along a thickness direction of said scale plate from a backside thereof;

a second light source disposed in a radial outside of said first light source for supplying light into said guide plate from an end thereof, light having different color to said first light source;

means for detecting an environmental brightness of said vehicle;

means for controlling said light sources so that said first light source or said second light source is activated according to a detected value of said detecting means;

means for adjusting a brightness of at least one of said first light source and said second light source; and a guide member for guiding light to supply light of said second light source to the right side of said scale plate from an outside thereof.

9. A meter for a vehicle, comprising:

a scale plate made of a transparent material having scales thereon;

a guide plate disposed along a backside of said scale plate for guiding light;

an actuator having a shaft passing through holes formed on said scale plate and said guide plate;

a pointer supported on said shaft at a base thereon;

a first light source for supplying light along a thickness direction of said scale plate from a backside thereof; and a second light source disposed in a radial inside of said first light source for supplying light into said guide plate from an end thereof, light having different color to said first light source.

10. A meter for a vehicle, comprising:

a scale plate made of a transparent material having scales thereon;

a guide plate disposed along a backside of said scale plate for guiding light;

an actuator having a shaft passing through holes formed on said scale plate and said guide plate;

a pointer supported on said shaft at a base thereon;

a first light source for supplying light along a thickness direction of said scale plate from a backside thereof;

a second light source disposed in a radial outside of said first light source for supplying light into said guide plate from an end thereof, light having different color to said first light source; and a guide member for guiding light to supply light of said second light source to the right side of said scale plate from an outside thereof.

11. A meter for a vehicle according to claim 9, wherein:

said pointer comprises a light emitting pointer and a third light source for supplying light into said light emitting pointer, light having different color to both of said first and second light.

12. A meter for a vehicle according to claim 9, wherein:

said light sources are mounted on a circuit board disposed in parallel with said scale plate.

13. A meter for a vehicle according to claim 11, further comprising:

a cylindrical shade for separating said second light source and said third light source.

14. A meter for a vehicle according to claim 9, wherein:

said scale plate includes an inner portion having circumferentially arranged character part and a ring-shaped outer portion disposed in a radial outside of said inner portion having scales part, said outer portion being formed in a slanted manner so that an inner edge of said outer portion is located in a backside of said inner portion, and wherein said guide plate has an end for supplying light to the right side of said outer portion.

15. A meter for a vehicle according to claim 9, wherein:

said scale plate includes an inner portion having circumferentially arranged character part and a ring-shaped outer portion disposed in a radial outside of said inner portion having scales part, said outer portion being formed in a slanted manner so that an inner edge of said outer portion is located in a backside of said inner portion, and wherein said first light source supplies light passing through between said inner portion and said outer portion.

* * * * *